United States Patent [19]

Marcus et al.

[11] Patent Number: 4,511,954
[45] Date of Patent: Apr. 16, 1985

[54] VISOR WITH AUXILIARY LIGHT

[75] Inventors: Konrad H. Marcus; Michael J. Cody, both of Holland, Mich.

[73] Assignee: Prince Corporation, Holland, Mich.

[21] Appl. No.: 448,940

[22] Filed: Dec. 13, 1982

[51] Int. Cl.³ .................. F21V 21/28; F21V 33/00; B60Q 3/02

[52] U.S. Cl. .................. 362/275; 362/74; 362/144; 362/287; 362/427; 362/365; 362/330

[58] Field of Search ............. 362/144, 142, 140, 427, 362/428, 275, 287, 74, 64, 65, 135, 419, 364, 365, 200, 330; 296/97 H, 97 B, 97 R

[56] References Cited

U.S. PATENT DOCUMENTS

| 1,456,927 | 5/1923 | Kumpf | 362/287 X |
| 2,466,454 | 4/1949 | Logan | 362/141 |
| 2,636,979 | 4/1953 | Schwartz | 362/275 |
| 3,375,364 | 3/1968 | Marcus | 362/144 |
| 3,533,648 | 10/1970 | Thieberger | 362/427 X |
| 4,049,309 | 9/1977 | Seal | 362/65 X |
| 4,421,355 | 12/1983 | Marcus | 362/144 |
| 4,470,106 | 9/1984 | Norton | 362/287 |

FOREIGN PATENT DOCUMENTS

| 1221782 | 1/1960 | France | 362/106 |
| 77355 | 9/1950 | Norway | 362/427 |

Primary Examiner—Stephen C. Bentley
Assistant Examiner—John S. Maples
Attorney, Agent, or Firm—Price, Heneveld, Huizenga & Cooper

[57] ABSTRACT

An auxiliary visor light includes a visor body coupled to a vehicle and including a light housing coupled to the visor body and movable between a stored position substantially flush with the visor body and a use position projecting from the visor body and which is laterally directable to provide selective illumination to the interior of a vehicle.

7 Claims, 2 Drawing Figures

VISOR WITH AUXILIARY LIGHT

BACKGROUND OF THE INVENTION

The present invention relates to vehicle visors and particularly to a visor with lighting means.

Visors with illuminated vanity mirrors have become very popular standard and optional items for vehicles. The lights provided on such visors can be employed either in connection with a makeup mirror for personal care or when the visor is oriented in a lowered and forwardly extending direction, as lighting for use in reading maps or other material in low ambient light conditions. U.S. Pat. No. 4,075,468 issued Feb. 21, 1978, and assigned to the present assignee is representative of such visor construction.

SUMMARY OF THE PRESENT INVENTION

The apparatus of the preferred embodiment of the present invention represents an improvement over the existing illuminated visors in that it provides a visor body having lighting means which is movable with respect to the visor body to be directable for use either in illuminating the face of a user when a mirror is mounted to the visor body or directable to locations within the interior of the body of the vehicle for use as a map reading lamp or for other functions.

Apparatus embodying the present invention includes a vehicle visor body and including therein light means coupled to the visor body and movable between a stored position substantially flush with the visor body and a use position projecting from the visor body and directable to provides selective illumination to the interior of a vehicle.

In the preferred embodiment of the invention, the directable illumination means included a housing which was pivoted on an axis parallel to the pivot axis of a vehicle visor body and also on an axis orthogonal to the pivot axis of the visor body to direct illumination fore and aft within the vehicle as well as laterally.

These and other features, objects and advantages of the present invention will become apparent upon reading the following description thereof together with reference to the accompanying drawings in which:

DETAILED DESCRIPTION OF THE PREFERRED EMBODIMENT

Figure 1:
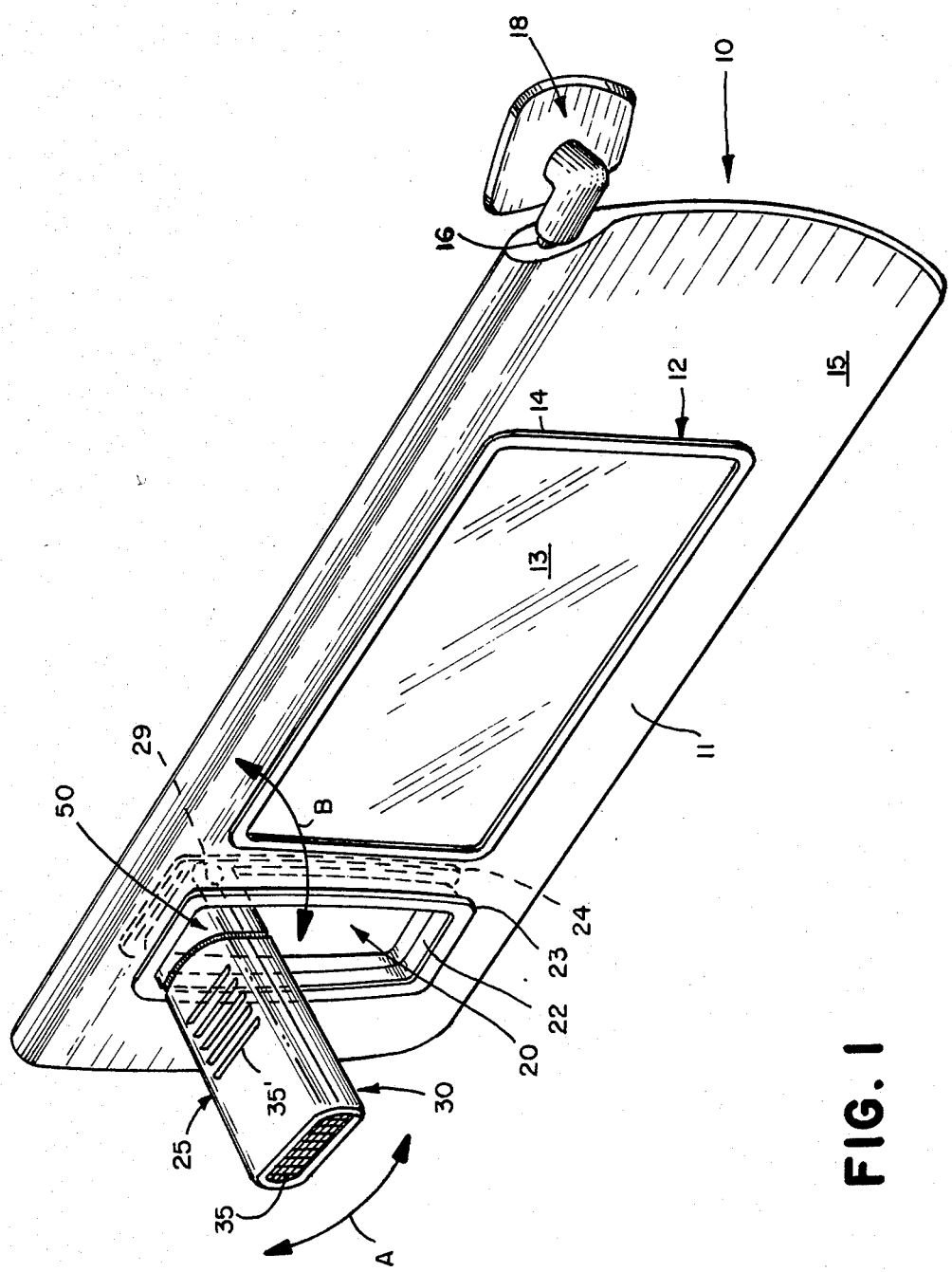
FIG. 1 is a perspective view of apparatus embodying the present invention.

Referring initially to FIG. 1, there is shown a visor 10 embodying the present invention and which has a body 11 which can be made of a molded polymeric material of the type disclosed in U.S. Pat. No. 3,926,470, issued Dec. 16, 1975, the disclosure of which is incorporated herein by reference. The visor body 11 includes a central rectangular recess for receiving a mirror and frame assembly 12 including a mirror 13 and frame 14 surrounding the mirror and conventionally mounted within the visor body 11 on a side facing the vehicle occupant when the visor is in a lowered position, as shown in FIG. 1. The visor assembly also includes a pivot arm 16 mounted to an elbow mounting assembly 18 which can be of conventional construction to permit visor movement. Visor 10 can be upholstered by a fabric 15 to match the vehicle interior and includes a rectangular recess 20 extending through the visor body and incorporating the lighting means of the present invention.

Recess 20 is a generally vertically extending, elongated, rectangular aperture surrounded by a molded polymeric frame 22 having a forward facing flange 23 and a rearward facing flange 24 defining a frame into which the pivoted directable lighting means 30, of the present invention, is mounted. The lighting means includes a light housing assembly 25 which is pivotally coupled to mounting bracket assembly 50. Assembly 25 pivots laterally (i.e.: side-to-side) with respect to the vehicle interior, as illustrated by arrow A in FIG. 1, while assembly 50, in turn, is pivotally coupled within recess 20 to swing the entire lighting means 30 through recess 20 to either side of the visor, as illustrated by arrow B in FIG. 1.

Figure 2:
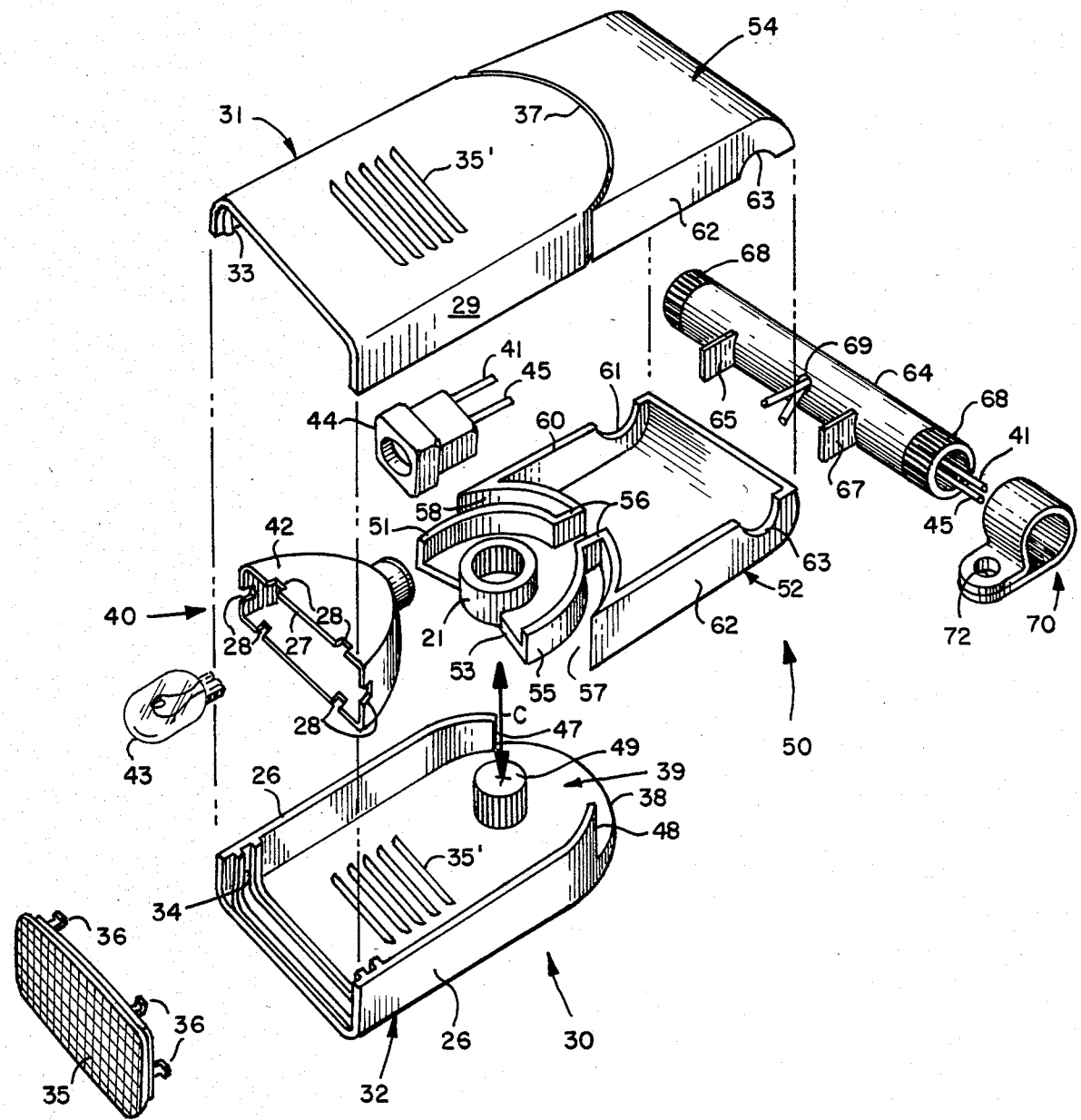
FIG. 2 is an enlarged, exploded view of the lighting means shown in FIG. 1.

Referring now to FIG. 2, housing assembly 25 includes an upper housing shell 31 and a lower housing shell 32 each of which are of substantially identical construction and include a U-shaped facing slot 33 and 34 near one end, respectively, for captively receiving and holding the peripheral flange 27 of a light reflector 42. Reflector 42 is generally concave with a reflective interior coating to direct light from lamp 43 outwardly through lens 35. Lens 35 extends along the width of the rectangular first end of assembly 25 and includes rearwardly projecting locking tabs 36 to releasably snap-fit the lens into the housing 25 with tabs 36 extending over the ridges defining recesses 33 and 34. Clearance for tabs 36 is provided by slots 28 formed in the flange 27 of reflector 42. The opposite end of each housing half 31 and 32 is curved with a semicircular end 37 and 38, respectively. Mating sidewalls 26 and 29 join and enclose the housing halves when assembled.

A light assembly 40 is mounted within housing shells 31 and 32 and includes the reflector 42, into which a socket 44 is mounted for receiving lamp 43 mounted within the reflector and into socket 44. Socket 44 is electrically coupled to the vehicle's electrical system by means of conductors 41 and 45, as described below. The mating sidewalls 26 and 29 of shells 31 and 32 have curved rearward edges each terminating in an open, arcuate slot 39 extending over approximately a 90° angle. Edges 47 and 48 extend adjacent the boundry of walls 26 and 29 to provide a stop against the lateral directivity of the lamp, as described below. A pivot pin 49 is integrally formed with and extends upwardly from housing 32 through a circular collar 21 integrally formed in a lower mounting housing member 52 which is mated with a corresponding and substantially identical upper mounting housing member 54 to form the mounting bracket assembly 50. Housing member 52 includes a generally semicircular, annular floor 53 bounded by arcuate wall sections 51 and 55 terminating in vertical end walls 56 against which edges 47 and 48 engage at the adjustable limits of the lighting means 30. This construction provides a pair of opposing, arcuate slots 57 and 58 into which the curved ends of walls 26 and 29 can extend and travel during adjustment of the light assembly 30 with respect to bracket assembly 50.

Collar 21 is supported centrally within floor 53 to receive a pivot pin 49 extending upwardly from housing 32 (a similar pivot structure is provided by housing 31 and housing members 54) and which is snuggly fitted within the internal diameter of collar 21 to be pivoted therein about the pivot axis C, shown in FIG. 2, and remain in an adjusted pivoted position. Housing members 52 and 54 include a rearward portion of generally the same configuration with sidewalls 60 and 62 which mate and which each have semicircular recesses 61 and 63, respectively, which partially circumscribe a pivot shaft 64. Assembly 50 including housing members 52 and 54 is held in alignment with respect to pivot shaft 64 by means of integrally molded stops 65 and 67 formed on shaft 64 and fitted immediately inside and adjacent walls 60 and 62 and the floors of the housing halves. Shaft 64 is knurled at opposite ends 68 to fit within a pair of friction socket brackets 70 (one shown) which are secured by fastening screws which extend through aperture 72 of each bracket 70 and into the visor core. Frame 22 surrounds recess 20 and includes apertures 29 permitting shaft 64 (FIG. 1) to extend therethrough. Thus, the pivoting movement between the light assembly and the visor body occurs at the interface of shaft ends 68 within fixed brackets 70. The inner surface of bracket 70 can also include one or more indentations which cooperate with the ends 68 of shaft 64 to provide selected detent positions of adjustment of the light assembly about an arc of about 180° of movement. In the preferred embodiment, the bracket and pivot shaft were formed to provide a holding detent for the stored position of the assembly flush with the visor body.

Conductors 41 and 45 extend through an aperture 69 formed in the wall of the hollow, cylindrical pivot shaft 64 and extend outwardly through one end, as best seen in FIG. 2, to communicate with an on/off switch such that lamp 43 can be selectively actuated for providing illumination from the lighting means 30.

Each of housings 31 and 32 may include venting louvers 35' to dissipate heat generated by lamp 43. Housing sections 31 and 32 can be assembled by a suitable bonding adhesive along the mating edges of sidewalls 26 and 29, as can be housing sections members 52 and 54, or by suitable fastening screws.

With the auxiliary light system of the present invention, therefore, regardless of the position of the visor, the auxiliary lighting means 30 can be moved from a stored position substantially flush and parallel with the visor body to an outwardly extending position, as illustrated in FIG. 1, either on the side, as shown in FIG. 1, or the opposite side of the visor (when the visor is in a stored position against the vehicle headliner) and pivoted to direct light away from the visor. The light also can be pivoted on pivot pin 49 over approximately a 90° angle, as indicated by arrow A in FIG. 1, to laterally adjust the direction of light emitted through lens 35. Conductors 41 and 45 can extend to a switch conveniently located in the vehicle or on the visor or light housing for operation of the lighting means. If desired, a dual intensity light can be provided by providing a series resistor and a three position switch which switches the resistor in and out of the circuit. Each of the housings can be molded of a suitable polymeric material such as polycarbonate and either snap-fitted or fastened together or bonded by a suitable bonding adhesive. The visor may include a covered or uncovered mirror, as shown.

These and other modifications to the preferred embodiment of the invention as described herein can be made without departing from the spirit or scope thereof as defined by the appended claims.

The embodiments of the invention in which an exclusive property or privilege is claimed are defined as follows:

1. A visor for an automotive vehicle having auxiliary lighting means comprising:

A visor body having first and second surfaces and peripheral edges defining the outline of said visor, said visor including a light assembly receiving recess formed and extending through said visor body providing an opening in both of said surfaces, said recess being located within peripheral outline of said visor body;

a light assembly comprising a light housing having a lens mounted in one end and a lamp positioned within said housing for directing illumination through said lens; means for pivotally mounting said assembly to said visor body within said recess for movement between a stored position within said recess to a use position pivoted outwardly from either of said surfaces of said body whereby said light assembly is accessible from either of said first and second surfaces and said light assembly is permitted to be pivoted outwardly from either surface of said visor body and wherein said means for pivotally mounting said light assembly to said visor body includes a pivot connection between said housing and said means for pivotally mounting said light assembly to said visor body to permit lateral movement of said light assembly.

2. Auxiliary lighting means for a vehicle visor having first and second spaced surfaces and peripheral edges defining the outline of said surfaces; a recess in said surfaces comprising:

a light assembly including a relatively flat housing adapted to be positioned in said recess flush with said surfaces and means located between said surfaces for pivotally mounting said assembly to said vehicle visor for movement about a first axis between a stored position within said recess in said visor to a use position pivoted outwardly from said recess; and a coupling between said light assembly and said means for pivotally mounting said light assembly to permit movement of said light assembly about a second axis generally orthogonal to said first axis.

3. The apparatus as defined in claim 2 wherein said light assembly comprises a light housing having a lens mounted in one end and a lamp positioned within said housing for directing illumination through said lens.

4. The apparatus as defined in claim 3 wherein said light housing is relatively flat and has a curved end remote from said one end and sidewalls terminating in spaced relationship at said remote end to define end stops.

5. The apparatus as defined in claim 4 wherein said coupling includes a relatively flat housing member having curved slots extending therein and terminating in end walls which engage said end stops of said light housing.

6. The apparatus as defined in claim 5 wherein said coupling includes a pivot pin mounted within said light housing member and a pin receiving collar mounted to said housing and concentric with said curved slots.

7. The apparatus as defined in claim 6 and further including a pivot shaft extending from said housing member in a direction generally orthogonal to the axis of said collar and near an end remote from said light housing.

* * * * *